(12) United States Patent
Bisson et al.

(10) Patent No.: US 11,136,255 B2
(45) Date of Patent: Oct. 5, 2021

(54) SYSTEMS AND METHODS FOR THERMALLY CONTROLLING WARP

(71) Applicant: CORNING INCORPORATED, Corning, NY (US)

(72) Inventors: Antoine Gaston Denis Bisson, Corning, NY (US); Kevin Patrick McNelis, Elmira, NY (US); Rohit Rai, Painted Post, NY (US); John Richard Ridge, Hammondsport, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1071 days.

(21) Appl. No.: 15/181,706

(22) Filed: Jun. 14, 2016

(65) Prior Publication Data

US 2016/0368807 A1 Dec. 22, 2016

Related U.S. Application Data

(60) Provisional application No. 62/180,173, filed on Jun. 16, 2015.

(51) Int. Cl.
*C03B 23/03* (2006.01)
*C03B 23/035* (2006.01)
*C03B 23/023* (2006.01)

(52) U.S. Cl.
CPC ...... *C03B 23/0307* (2013.01); *C03B 23/0235* (2013.01); *C03B 23/0302* (2013.01); *C03B 23/0352* (2013.01)

(58) Field of Classification Search
CPC .......... C03B 23/0307; C03B 23/0302
See application file for complete search history.

(56) References Cited

U.S. PATENT DOCUMENTS 4,891,055 A 1/1990 Shibaoka et al.
5,009,694 A 4/1991 Nishitani et al.
(Continued)

FOREIGN PATENT DOCUMENTS

CN 104024169 A 9/2014
CN 104428262 A 3/2015
(Continued)

OTHER PUBLICATIONS

International Search Report and Written Opinion PCT/US2016/037561 dated Sep. 16, 2016.
(Continued)

*Primary Examiner* — Queenie S Dehghan
(74) *Attorney, Agent, or Firm* — John P. McGroarty

(57) ABSTRACT

Embodiments disclosed herein include systems and methods for controlling material warp that include placing the shaped mold in a heating device, forming a glass material into a shaped mold, and cooling the glass material and the shaped mold to a predetermined viscosity of the glass material. Some embodiments include, a predetermined time prior to removing the glass material and the shaped mold from the heating device, holding the glass at the mold in the heating device where the heating device temperature is substantially equal to mold and glass temperature just prior to exiting to ambient temperature. Some embodiments include removing the glass material and the shaped mold from the heating device to further cool the glass material and the shaped mold at ambient temperature, where after removing the glass material and the shaped mold from the heating device, the glass material will exhibit controlled or desired material warp.

11 Claims, 4 Drawing Sheets

(56) References Cited

U.S. PATENT DOCUMENTS

| | | |
|---|---|---|
| 8,429,936 B2 | 4/2013 | Allan et al. |
| 8,783,066 B2 | 7/2014 | Bailey et al. |
| 9,010,153 B2 | 4/2015 | Ukrainczyk et al. |
| 2002/0020192 A1 | 2/2002 | Bader et al. |
| 2004/0206123 A1 | 10/2004 | Fotheringham et al. |
| 2010/0000259 A1 | 1/2010 | Ukrainczyk et al. |
| 2013/0125588 A1* | 5/2013 | Kladias ............... C03B 23/0258 65/103 |
| 2014/0234581 A1 | 8/2014 | Immerman et al. |
| 2015/0040612 A1 | 2/2015 | Afzal et al. |
| 2015/0047393 A1 | 2/2015 | Luo et al. |
| 2015/0107305 A1 | 4/2015 | Wei |

FOREIGN PATENT DOCUMENTS

| | | |
|---|---|---|
| CN | 104556641 A | 4/2015 |
| EP | 0400631 A2 | 12/1990 |
| JP | 58-049630 A | 3/1983 |
| JP | 01-122931 A | 5/1989 |
| JP | 01-122932 A | 5/1989 |
| JP | 03-005333 A | 1/1991 |
| JP | 11-022931 A | 1/1999 |
| JP | 2004-525064 A | 8/2004 |
| JP | 2011-526874 A | 10/2011 |
| JP | 2016-531829 A | 10/2016 |
| TW | 201437159 A | 10/2014 |
| TW | 201520176 A | 6/2015 |
| WO | 2012118612 A1 | 9/2012 |
| WO | 2013078037 A1 | 5/2013 |

OTHER PUBLICATIONS

European Patent Application No. 16733798.9 Communication pursuant to Article 94(3) EPC dated Nov. 9, 2020; 5 Pages; European Patent Office.

Japanese Patent Application No. 2017-565290, Notice of Reasons for Refusal dated May 29, 2020; 6 pages; (3 pages of English Translation and 3 pages of Original Document) Chinese Patent Office.

* cited by examiner

SYSTEMS AND METHODS FOR THERMALLY CONTROLLING WARP

CROSS-REFERENCE TO RELATED APPLICATIONS

This application claims the benefit of priority under 35 U.S.C. § 119 of U.S. Provisional Application Ser. No. 62/180,173 filed on Jun. 16, 2015 the content of which is relied upon and incorporated herein by reference in its entirety.

BACKGROUND

Field

The present disclosure generally relates to systems and methods for thermally controlling warp and, more specifically, to embodiments of forming a three dimensional glass material such that warp is controlled.

Technical Background

There is growing customer interest for three dimensional (or non-planar) glass covers for hand-held display devices. Specifically, many of these devices now include a three dimensional glass material that includes 90 degree (or other angle) bend to cover more than one surface of the display device. As such, these bends generally have a very small bend radius. With the desire for these three dimensional glass covers, forming the glass material into the desired shape may be difficult because of the small tolerance allowed for flatness and shape of the glass cover.

In many current forming solutions, the glass material is heated in a controlled environment to low viscosities so that the glass material can conform to the shaped mold in a shorter time. Thermal gradients typically present in the glass produce undesirable warp as it cools down to room temperature. Moreover, the shaped mold may be warped due to thermal cycles during processing of the glass material, which can further increase warp of the glass material that is undesirable. Additionally, subsequent processing of the glass material, such as ion-exchange strengthening of the glass material, may further cause undesirable deformation of glass material. Thus, a need exists in the technology.

SUMMARY

Embodiments disclosed herein provide methods for controlling material warp that includes placing the shaped mold in a heating device, forming a glass material into a shape of the shaped mold, and cooling the glass material and the shaped mold to a predetermined viscosity of the glass material. Some embodiments include, a predetermined time prior to removing the glass material and the shaped mold from the heating device, holding the glass at the mold in the heating device where the heating device temperature is substantially equal to mold and glass temperature just prior to exiting the heating device into ambient temperature. Some embodiments include removing the glass material and the shaped mold from the heating device to further cool the glass material and the shaped mold at ambient temperature, where after removing the glass material and the shaped mold from the heating device, the glass material will exhibit a desired material warp.

Embodiments of another method disclosed herein may include forming a glass material into a shape of a shaped mold, where the shaped mold and the glass material are placed into a heating device, where the shaped mold comprises a center section and an edge, and where the glass material and the shaped mold are heated to create a predetermined temperature differential between the edge and the center section. Some embodiments may include cooling the glass material and the shaped mold to a predetermined viscosity of the glass material, where the predetermined temperature differential between the edge and the center section is maintained. Some embodiments include, a predetermined time prior to removing the glass material and the shaped mold from the heating device, further cooling the glass material and the shaped mold such that a temperature of the shaped mold is substantially equal to a temperature of the heating device. Similarly, some embodiments include removing the glass material and the shaped mold from the heating device to further cool the glass material and the shaped mold at ambient temperature, where after removing the glass material and the shaped mold from the heating device, the glass material will exhibit a desired material warp.

Embodiments of a system disclosed herein include a heating device that includes a heating element and a cooling element, as well as a shaped mold for receiving a glass material for molding into a predetermined three dimensional configuration. The shaped mold may include a center section and an edge. The system may be configured to heat the glass material and the shaped mold via the heating element to form the glass material into the predetermined configuration, such that there is a predetermined temperature differential between the edge and the center section. The system may further cool, via the cooling element, the glass material and the shaped mold to a predetermined viscosity of the glass material and wherein the predetermined temperature differential between the edge and the center section is maintained. Some embodiments may further cool, by the cooling element, the glass material and the shaped mold for a predetermined amount of time prior to removing the glass material and the shaped mold from the heating device, such that a temperature of the shaped mold is substantially equal to a temperature of the heating device during the predetermined amount of time and remove the glass material and the shaped mold from the heating device to further cool the glass material and the shaped mold at ambient temperature, where after removing the glass material and the shaped mold from the heating device, the glass material will exhibit a desired material warp.

Additional features and advantages will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Embodiments disclosed herein relate to systems and methods for thermally controlling warp of a three dimensional glass material. Specifically, embodiments described herein are configured such that, when a shaped mold and glass material exits the heating device, a large temperature gradient develops in the glass material due to the non-mold side of glass being exposed to room-temperature air. This temperature gradient may provide a driving force for the glass material to separate from the shaped mold and acquire a shape that is different from the desired shape at room temperature. Further, in some embodiments, the temperatures of the heating device during the cooling stages are lower than the temperature of the shaped mold to allow faster cooling and consequently shorter cycles. Such embodiments, where the heating device is colder than the shaped mold during cooling, may provide temperature gradients that promote undesirable warp. Accordingly, warp may be managed by focusing on temperature gradients as the glass material is about to exit the heating device into an ambient temperature environment while allowing unfavorable temperature gradients earlier in the cooling (so as to have faster cooling and shorter cycle). To meet shape tolerances for the final product, embodiments described herein may be configured to impart positive warp to glass material when the glass material is subjected to ion exchange processes or to reduce undesirable warp when the glass material is not to be subject to ion exchange processes. Depending on the embodiment, undesirable warp may include any amount of negative warp or greater than a predetermined amount of negative warp. Negative warp may refer to warp of a glass material that has been formed on a concave shaped mold (e.g., where the glass material is formed on the inside or concave side of the shaped mold) and the warp is also in the concave direction. Similarly, some embodiments may utilize a convex shaped mold (e.g., where the glass material is formed on the outside or convex side of the shaped mold). In embodiments that utilize a convex shaped mold, the undesirable warp may be in the positive direction or in the convex direction. While embodiments described herein utilize a concave mold and thus undesirable warp may be negative warp and desirable warp may be non-negative or positive warp, these are merely examples.

Figure 1B:
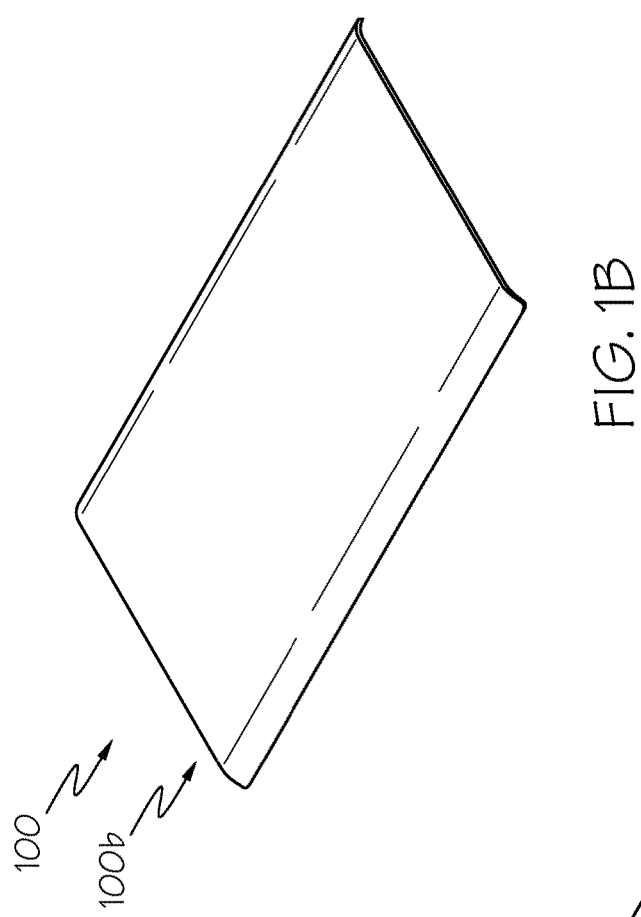
FIGS. 1A and 1B depict embodiments of a glass material with a dish configuration and a sled configuration, respectively, according to embodiments disclosed herein.
Figure 1A:
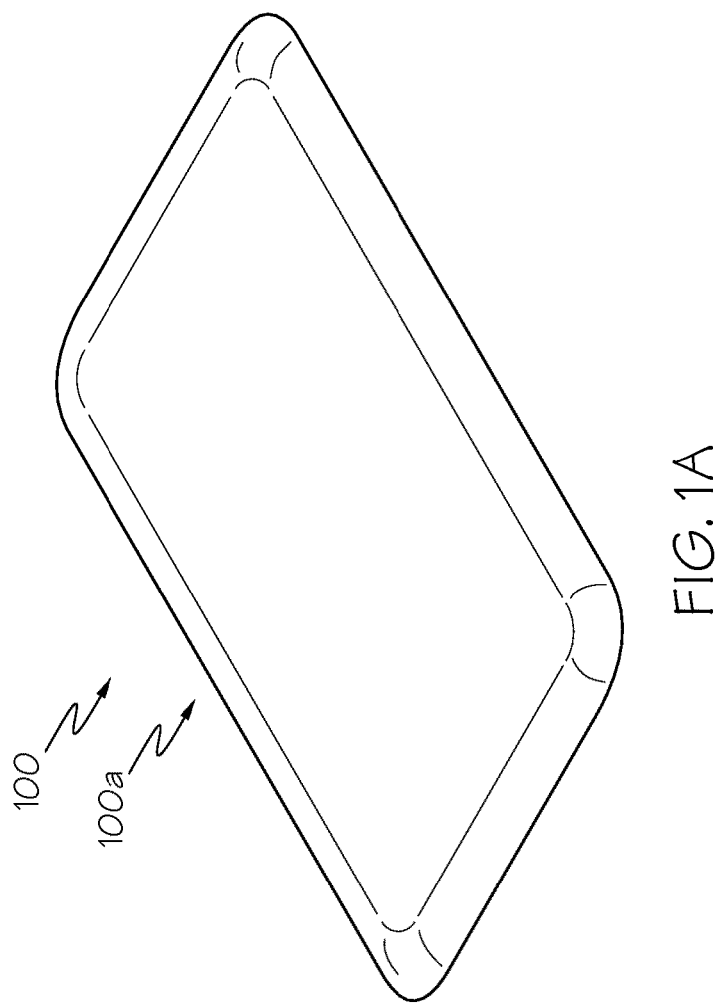

Referring now to the drawings, FIGS. 1A and 1B depict embodiments of a glass material 100 with a dish configuration 100a and a sled configuration 100b, according to embodiments disclosed herein. As illustrated in FIG. 1A, the dish configuration 100a includes a flat or near-flat center area with all four peripheries bent to accommodate a three dimensional attributes. In FIG. 1B, the three dimensional attributes are achieved via the sled configuration 100b includes a flat or a near-flat center portion and only two opposing peripheries being bent. As discussed in more detail below, these three dimensional glass materials may be formed into the depicted embodiments (and/or other embodiments) via thermo-mechanical processing of plane sheets of glass materials (preforms). The glass preform may be placed on an appropriately shaped mold 304 (FIG. 3), and the glass-mold assembly may be heated in a heating device 302 (FIG. 3), such as a furnace. The glass material 100 and the shaped mold 304 may be heated to temperatures where viscosities of the glass material 100 are low enough for forming the glass material 100 according to the shaped mold 304.

The glass material 100 is then forced to conform to the shaped mold 304 by application of a mechanical force. Depending on the particular embodiment, the mechanical force may include a vacuum, gas/air pressure, and/or pressure via a complimentary mold (in a 2-mold pressing process). After a predetermined time, the conforming force on glass material 100 may be removed, and at a later time and lower temperature, the glass material 100 may be unloaded from the shaped mold 304. Further cooling of glass material 100 to room temperature may take place with the glass material 100 having been separated from the shaped mold 304. These thermo-mechanical forming processes can be anisothermal or isothermal, depending on the embodiment. Anisothermal forming processes may be configured such that the different areas of the glass material 100 are subjected to different temperatures. This allows relatively shorter cycle times, with higher cosmetic quality of display area of the cover glass while forming bends with small radius (e.g., by having lower viscosities/higher temperatures at bends compared to the center area of the glass article).

Additionally, the glass material 100 may be subsequently annealed to improve machinability, reduce stresses/stress birefringence, and/or to improve the compressive stress in the ion exchange process. The relaxation of forming stresses during annealing may also be accompanied with warp. Specifically, this annealing warp may also contribute to deviation of the shape of the glass material 100 from the desired tolerances. Therefore, embodiments to control warp and stresses in anisothermal forming processes are described herein to achieve the shape tolerances demanded by customers. The embodiments may be applicable to a glass material 100 of different shapes, including those having a minimum bend radius (e.g., less than about 5 millimeters, but in some embodiments, may range from about 2 millimeters to about 10 millimeters or from about 10 millimeters to about 1000 millimeters) bends, which are of greater interest for customers of cover glass.

Figure 2A:
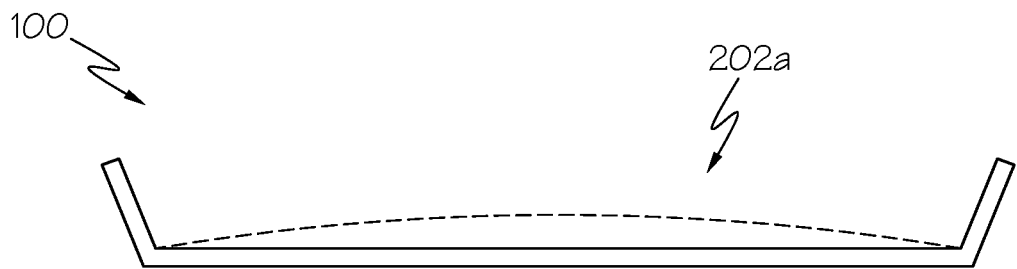
FIGS. 2A-2C depict embodiments of warp that a glass material might experience during the forming process, according to embodiments disclosed herein.
Figure 2B:
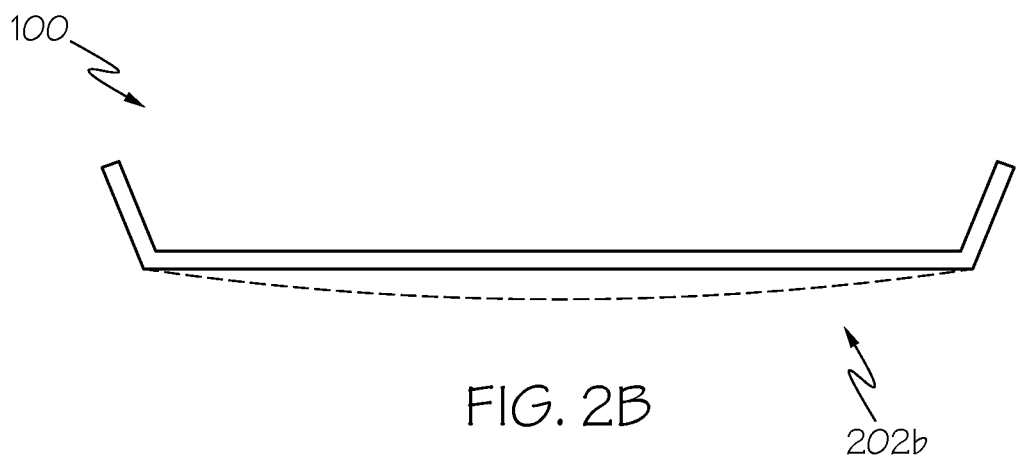
Figure 2C:
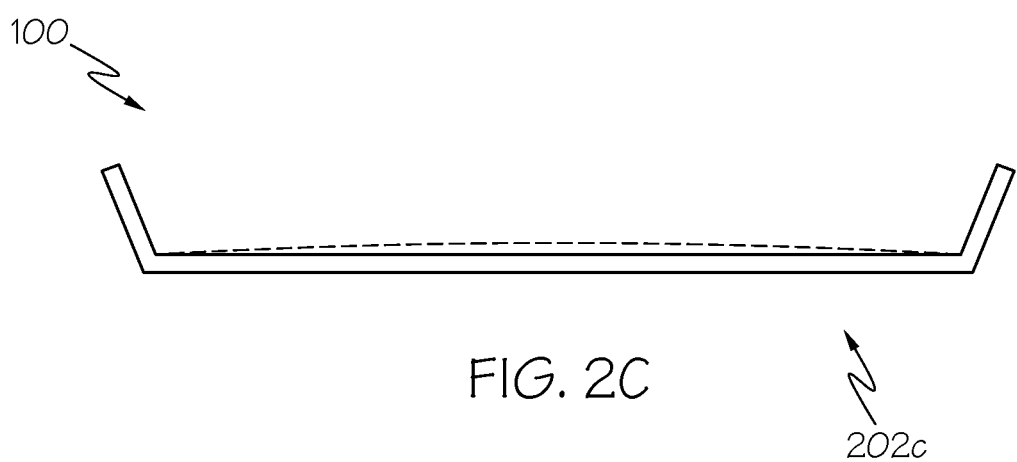

FIGS. 2A-2C depict embodiments of warp that a glass material 100 might experience during the forming process, according to embodiments disclosed herein. Specifically, FIG. 2A depicts a dome shaped negative warp 202a of a glass material 100, according to embodiments described herein. Specifically, many current solutions that utilize an anisothermal forming process often have a dome-shaped or negative warp. As discussed above, negative warp for a concave shaped mold includes warp of the glass material 100 that is in the concave direction (e.g., toward an inner portion of the glass material 100). This may be an undesirable formation because the negative warp often exceeds the maximum threshold for flatness of the glass material 100 and subsequent processing (such as performing an ion exchange process) of the glass material 100 may result in further negative warping of the glass material 100.

FIG. 2B depicts positive warp 202b of the glass material 100. Specifically, embodiments described herein may be configured to provide acceptable warp (direction and degree), such that after all processing of the glass material 100 is complete, the glass material 100 will have a shape and a warp that are within an acceptable threshold. As illustrated, positive warp is a deformation of the glass material in a convex direction or in a direction away from the inner portion of the glass material 100.

FIG. 2C depicts a warp 202c of the glass material 100 that occurs after the positive warp 202b has been realized in the forming process and then the ion exchange process. As is evident, the warp 202c may have zero warp or a warp 202c that is positive or negative, but within acceptable tolerances and thresholds for the final product.

Accordingly, embodiments described herein achieve positive center warp of the glass material 100 that focuses on the temperatures and temperature gradients at the time the mold exits the furnace. Shorter forming cycles are possible because these embodiments allow the mold to exit the heating device 302 at temperatures well above the annealing point of the glass material 100 and still have the right shape. Additionally, embodiments described herein promote faster cooling, and hence even shorter cycle times, by allowing for temperatures of the heating device 302 (FIG. 3) that are lower than the temperatures of the shaped mold 304 for most of the cooling. These embodiments perform well for both small and large radius shapes, and have been successfully validated for a glass material 100 in a variety of shapes.

Figure 3:
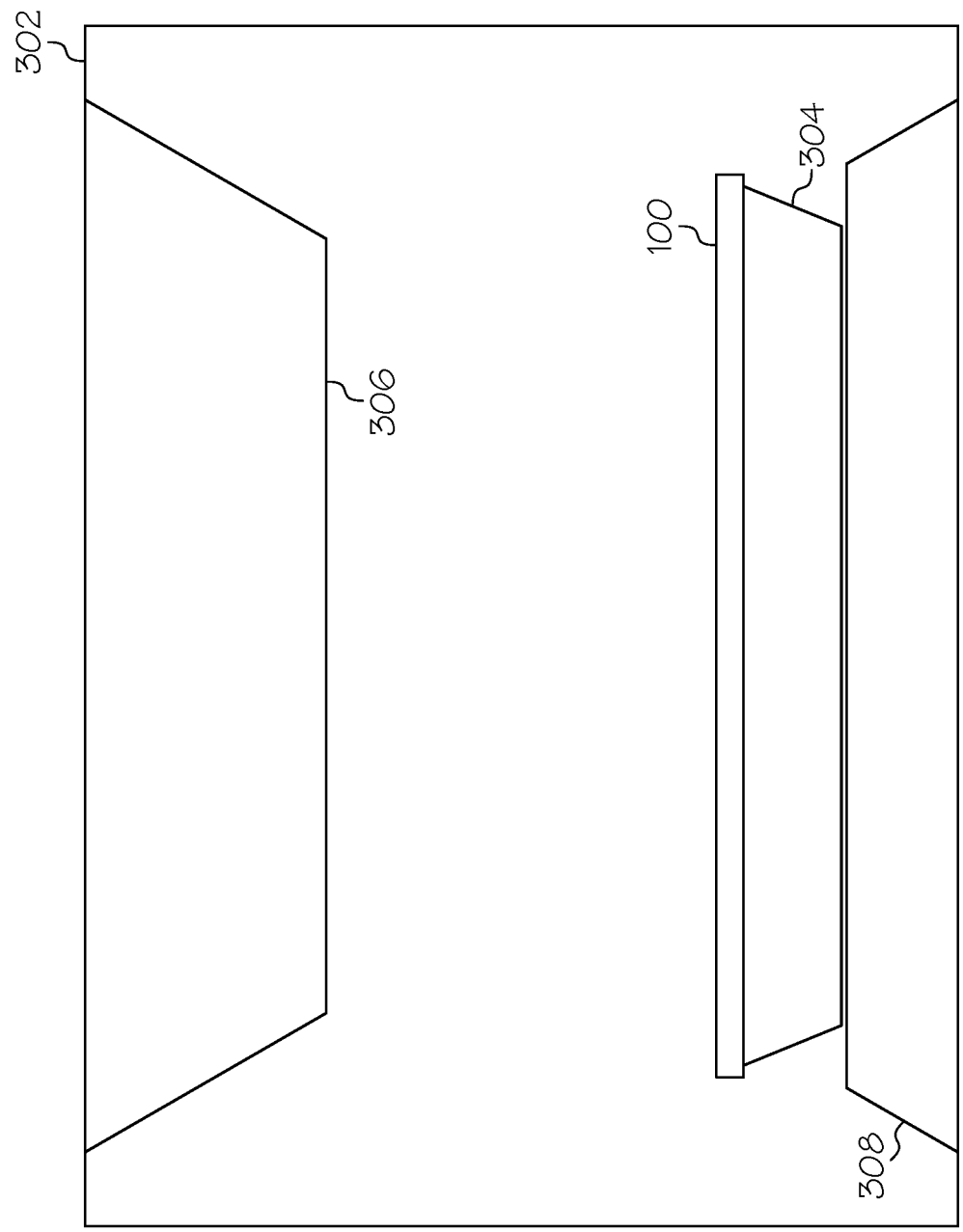
FIG. 3 depicts a heating device with the shaped mold and glass material, according to embodiments described herein.

FIG. 3 depicts a heating device 302 with the shaped mold 304 and glass material 100, according to embodiments described herein. As illustrated, a flat sheet (preform) of glass material 100 is placed on a shaped mold 304 (female) of desired shape and heated in the heating device 302. The heating device 302 may include a heating element 306 that is positioned above the shaped mold 304 and is configured to heat the preform and shaped mold 304 to high temperatures (and/or low viscosities). The heating device 302 may include a vacuum device, an air device and/or a pressure device for further molding the glass material 100. The heating element 306 (which may include one or more heating elements) is positioned to heat both shaped mold 304 and the glass material 100. As described below, if the temperature of the heating element 306 is lower than the temperature of the shaped mold 304, the shaped mold 304 and the glass material 100 may be cooled without utilizing the cooling element 308. Regardless, the glass material 100 is forced to conform to the mold by applying vacuum pressure, air pressure, or force from a complimentary mold. The glass material 100 and the shaped mold 304 are then cooled to a temperature where they can exit the heating device 302, and further cooled to a second lower temperature where the glass material 100 may be unloaded from shaped mold 304. The glass material 100 may then further cool to room temperature separate from the shaped mold 304.

Also included in FIG. 3 is a cooling element 308. The cooling element 308 may be configured to further apply the vacuum pressure during the forming process, and/or may provide cooling of the shaped mold 304 (such as via air cooling, liquid cooling, etc.) during the cooling process.

In one embodiment, once the glass sheet is completely conformed to the mold surface, the glass-mold assembly is cooled in the furnace for a fixed time that depends on the total cycle time. The cooling is performed by having the heating device 302 temperature below the temperature of the shaped mold 304 and/or with the cooling element 308 utilizing a fluid-cooled portion in contact with the mold on the side opposite to the glass. The flow rate of fluid in the cooling element 308 underneath the mold may be initially kept at a small value (e.g., about 15 standard liters per minute of air for a metallic mold of about 200 millimeters by 125 millimeters by 25 millimeters) so that stresses in formed glass material 100 are low. To promote low mold exit temperature in a fixed cooling time, the temperature of the heating device 302 may be reduced, except for about the last 15 seconds before the shaped mold 304 exits the heating device 302, when the temperature of the heating device 302 is substantially equal to the mold temperature. After the glass-mold assembly exits the heating device 302, the glass material 100 may be unloaded from the shaped mold 304 and then allowed to cool to room temperature. If the formed glass material 100 has an undesirable warp, such as negative warp (or not enough positive warp) at room temperature, the temperature of the heating device 302 may be matched with the temperature of the shaped mold 304 for a longer duration (e.g., for about 30 seconds) before the shaped mold 304 exits the heating device 302. The formed glass material 100 may then have a less negative (or more positive) warp.

As an example, some embodiments are configured such that the dish configuration 100a was formed in a heating device 302 with about a 15 second index time, a bowl-shaped warp of about 100 microns. The index time may include the duration of stay of the shaped mold 304 in the heating device 302 with a plurality of modules for heating and cooling. The magnitude was produced with mold exit temperature of about 36 degrees Celsius above the annealing point (viscosity was about $10^{12.2}$ Poise). The temperature of the last module was 2 degrees Celsius above the temperature of the shaped mold 304 (FIG. 3). The edges of the shaped mold 304 (with dimensions of about 200 millimeters by about 125 millimeters by about 25 millimeters) were about 25 degrees Celsius hotter than the center. In another example, warp of about 50 microns to about 150 microns magnitude may be produced with a mold exit temperature of about 20 degrees Celsius to about 50 degrees Celsius above the annealing point (e.g., $10^{11.75}$ Poise<viscosity<$10^{12.75}$ Poise). The temperature of the last module was 0 degrees Celsius to about 10 degrees Celsius above the temperature of the shaped mold 304. Additionally, the edges of the shaped mold 304 (with dimensions of about 200 millimeters by about 125 millimeters by about 25 millimeters) at about 5 degrees Celsius to about 20 degrees Celsius hotter than the center.

To further reduce the undesirable warp, such as negative warp (or increase positive warp), the center-to-edge temperature differential can be increased by increasing the temperature of the heating device 302 for a progressively larger duration, as the mold edges heat up faster than the center. Another embodiment may set the temperature of the heating device 302 well below the temperature of the shaped mold 304 during at least part of the cooling to reduce the center-to-edge temperature differential as the edges cool faster than the center of the shaped mold 304. In current solutions, when the temperature of the heating device 306 is lowered below that of the shaped mold 304, an objective may be to increase the cooling rate and reduce the temperature of the shaped mold 304 at exit from the heating device 306. The reduction is center-to-edge temperature differential (as the edges cool faster) is often an undesirable outcome. Accordingly, some embodiments may be configured to increase the temperatures of the heating device 302, which leads to higher center-to-edge temperature differential, thereby promoting positive warp.

Another embodiment may include increasing the mold-side cooling. Specifically, the center-to-edge temperature differential can be increased by selectively cooling the center area of the shaped mold 304 with the cooling element 308 that only contacts the center portion of the shaped mold 304. In addition to inducing the desired temperature differential, increasing mold-side cooling also reduces the exit temperature of the shaped mold 304. Both these factors help reduce undesirable warp. An example of a cooling element 308 is an air-cooled metallic chamber that is placed in close proximity of, or in contact with, the shaped mold 304. The flow rate of air through the cooling element 308 controls the heat extraction rate.

In some embodiments, the edges of the shaped mold 304 may be selectively heated. Specifically, the edges can be heated with respect to the center by placing the heating element 306 near the edges (either embedded in the shaped mold 304, or outside the shaped mold 304) during cooling.

Figure 4:
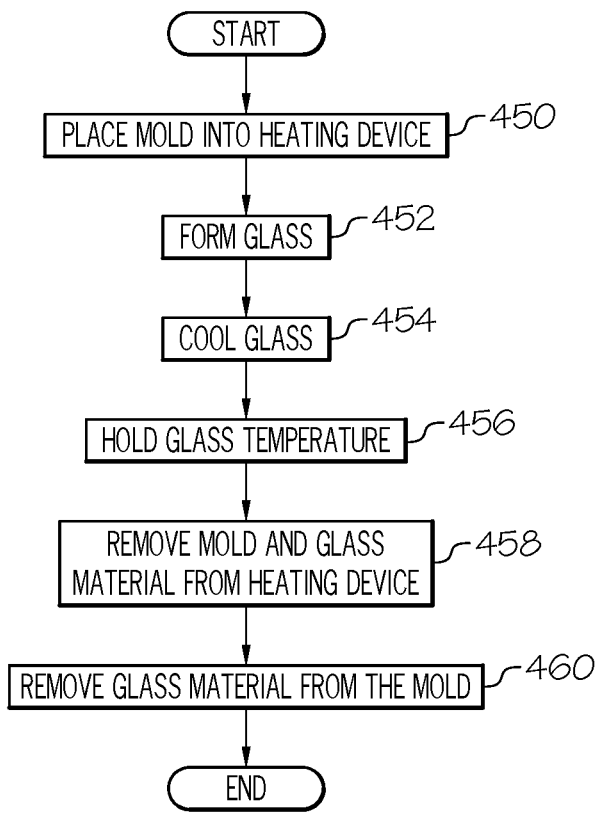
FIG. 4 depicts a process for thermally controlling warp of a glass material, according to embodiments described herein.

FIG. 4 depicts a process for controlling warp of a glass material 100, according to embodiments described herein. As illustrated in block 450, a shaped mold 304 and a glass material 100 may be placed into a heating device 302. In block 452, the glass material 100 may be formed according to the shaped mold 304. Specifically, the glass material 100 may be formed to a shaped mold 304 in the viscous temperature regime, at temperatures where the stress relaxation time (which may be calculated by dividing viscosity by shear modulus) is less than 1 second, so that more than 95% of stresses are relieved within 3 seconds.

In block 454, the glass material 100 and the shaped mold 304 may be cooled. As an example, the glass material 100 and the shaped mold 304 may be cooled in the heating device 302 so that the glass material 100 reaches a viscosity of about $10^{11.81}$ Poise to about $10^{12.47}$ Poise. In some embodiments, the temperature may be less than about 50 degrees Celsius above the annealing point for about $10^{11.81}$ Poise. In some embodiments, the viscosity may be greater than about $10^{12.13}$ Poise, with a temperature of less than about 40 degrees Celsius above the annealing point. In some embodiments, the viscosity may be greater than about $10^{12.47}$ Poise with the temperature less than about 30 degrees Celsius above the annealing point. In some embodiments, the glass material and the shaped mold are cooled to a temperature that is about 0 degrees Celsius to about 50 degrees Celsius greater than a temperature corresponding to about $10^{13.2}$ Poise glass viscosity when the glass material and the shaped mold are removed from the heating device. The glass material 100 and shaped mold 304 assembly may then be moved out of the heated furnace and into the room temperature environment.

Regardless, in block 456, the glass material 100 may be held at a predetermined temperature. During forming and cooling, and particularly as the glass exits the heating device 302 and enters the room temperature environment, the edges of the shaped mold 304 may be hotter than the center. This temperature difference may be about 0 degrees Celsius or may range from about 0 degrees Celsius to greater than about 15 degrees Celsius, depending on the embodiment. For a predetermined time, which may be at least about 15 seconds to about 30 seconds before the glass exits the furnace and enters the room temperature environment; glass material 100 may be cooled with the temperature of the heating device 302 being substantially equal to the temperature of the shaped mold 304. For example substantially equal to may include the temperature of the heating device 302 and the shaped mold 304 having a difference of 5% or less, 4% or less, 3% or less, 2% or less, or 1% or less. In some embodiments, the heating device 302 may be about 5 degrees Celsius to about 10 degrees Celsius hotter than the mold in about the last 15 seconds.

In block 458, the glass material 100 may be removed from the heating device 302. After exiting the heating device 302, glass material 100 may be cooled with the shaped mold 304 on the convex side and the room temperature air on the other side for about 15 seconds to about 30 seconds. In block 460, the glass material 100 may then be taken off of the shaped mold 304 and cooled to room temperature.

It should be understood that some embodiments may be configured to cool the glass material 100 and the shaped mold 304 by applying cooling to the shaped mold 304. This may be configured as a fan or other cooling mechanism to provide the described cooling.

Accordingly, embodiments of the process of FIG. 4 allow the shaped mold 304 to exit the heating device 302 at temperatures that are about 30 degrees Celsius to about 50 degrees Celsius above the annealing point of the glass material 100. This permits short cycle times (in some embodiments, about 6 minutes). Additionally, the temperature gradients in glass material 100 may be controlled by changing the temperature of the heating device 302 and varying the cooling of the shaped mold 304. Stresses and warp can be managed simultaneously by tuning these two parameters.

Figure 5:
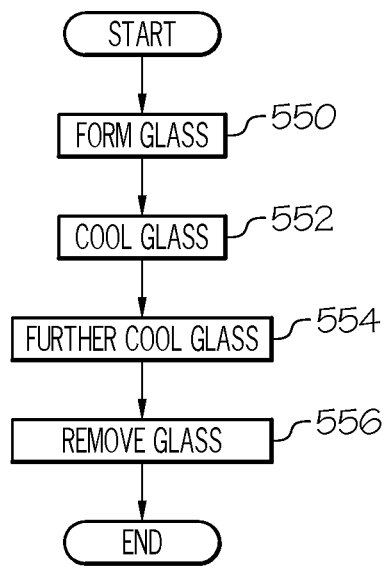
FIG. 5 depicts another process for thermally controlling warp of a glass material, according to embodiments described herein.

FIG. 5 depicts another process for thermally controlling warp of a glass material 100, according to embodiments described herein. As illustrated in block 550, the glass material 100 may be formed to fit into a shaped mold 304, where the shaped mold 304 and the glass material 100 are placed into a heating device 302, and where the shaped mold 304 includes a center section and an edge. In some embodiments, the glass material 100 and the shaped mold 304 are heated to create a predetermined temperature differential between the edge and the center section. In block 552, the glass material 100 and the shaped mold 304 may be cooled to a predetermined viscosity of the glass material 100, where the predetermined temperature differential between the edge and the center section is maintained. In some embodiments, the temperature differential is between about 5 degrees Celsius and about 50 degrees Celsius greater than the center section when the glass material is conformed to the shaped mold 304 and about 0 degrees Celsius to about 15 degrees Celsius greater than the center section at exit from the heating device 302.

In block 554, a predetermined time prior to removing the glass material 100 and the shaped mold 304 from the heating device 302, the glass material 100 and the shaped mold 304 may be cooled such that a temperature of the shaped mold 304 is substantially equal to a temperature of the heating device 302. For example substantially equal to may include the temperature of the heating device 302 and the shaped mold 304 having a difference of 5% or less, 4% or less, 3% or less, 2% or less, or 1% or less. In block 556, the glass material 100 and the shaped mold 304 may be removed from the heating device 302 to further cool the glass material 100 and the shaped mold 304 at ambient temperature (or otherwise being exposed to ambient air), where after removing the glass material 100 and the shaped mold 304 from the heating device 302, the glass material 100 will exhibit controlled or desired material warp.

Accordingly, embodiments described herein may be configured to form three dimensional glass materials to tight shape tolerances for both small and large radiuses. These embodiments may be used to counter warp of the glass material 100 in downstream processes such as edge machining and ion-exchange by imparting a reverse warp. Embodiments may also be configured to form glass materials with a desired shape even if the shaped mold 304 is warped due to thermal cycling. Some embodiments may also be configured to reduce cycle time (and higher production rate) by unloading the glass material 100 at higher temperatures (e.g. about 30 degrees Celsius to about 50 degrees Celsius above the annealing point of the glass material 100). Embodiments may also permit faster cooling by depending on temperature gradients primarily near the furnace exit or towards the viscoelastic-elastic boundary, rather than throughout the viscoelastic temperature regime. This allows faster cooling of glass material 100 and shaped mold 304. Embodiments may also be configured to manage stresses in formed parts of the glass materials. Specifically, formed parts may be machined to have the edge geometry demanded by the customer; to have slots and apertures for features on the end product device.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for controlling material warp, comprising:
   placing a glass material and shaped mold in a heating device to heat the glass material and the shaped mold;
   forming the glass material into a shape of the shaped mold;
   cooling the glass material and the shaped mold to a predetermined viscosity of the glass material;
   holding, for a predetermined time prior to removing the glass material and the shaped mold from the heating device, the glass material and the shaped mold in the heating device where a temperature of the heating device is substantially equal to a temperature of the shaped mold and the glass material just prior to exiting the heating device into ambient temperature; and
   removing the glass material and the shaped mold from the heating device and unloading the glass material from the shaped mold such that the glass material cools to the ambient temperature separately from the shaped mold, wherein after removing the glass material and the shaped mold from the heating device, the glass material will exhibit a desired material warp.

2. The method of claim 1, wherein the shaped mold comprises a center section and an edge, wherein the glass material is heated to create a predetermined temperature differential that is between about 5 degrees Celsius and about 50 degrees Celsius greater than the center section when the glass material is conformed to the shaped mold.

3. The method of claim 1, wherein the glass material and the shaped mold are cooled to a temperature that is about 0 degrees Celsius to about 50 degrees Celsius greater than a temperature corresponding to about $10^{13.2}$ Poise glass viscosity when the glass material and the shaped mold are removed from the heating device.

4. The method of claim 1, wherein the glass material comprises a three dimensional glass material with a minimum bend radius of about 2 millimeters to about 10 millimeters.

5. The method of claim 1, wherein the glass material comprises a three dimensional glass with a minimum bend radius from about 10 millimeters to about 1000 millimeters.

6. The method of claim 1, wherein a viscosity of the glass material upon exiting from the heating device to the ambient temperature is greater than about $10^{11.81}$ Poise.

7. A method for controlling material warp, comprising:
   forming a glass material into a shape of a shaped mold, wherein the shaped mold and the glass material are placed into a heating device, wherein the shaped mold comprises a center section and an edge, wherein the glass material and the shaped mold are heated to create a predetermined temperature differential between the edge and the center section;
   cooling the glass material and the shaped mold to a predetermined viscosity of the glass material, wherein the predetermined temperature differential between the edge and the center section is maintained;
   further cooling, for a predetermined time prior to removing the glass material and the shaped mold from the heating device, the glass material and the shaped mold such that a temperature of the shaped mold is substantially equal to a temperature of the heating device; and
   removing the glass material and the shaped mold from the heating device and unloading the glass material from the shaped mold such that the glass material cools to ambient temperature separately from the shaped mold, wherein after removing the glass material and the shaped mold from the heating device, the glass material will exhibit a desired material warp.

8. The method of claim 7, wherein the edge is heated to a temperature that is between about 5 and 50 degrees C. greater than the center section when glass is being conformed to the shaped mold, and between about 0 degrees Celsius and about 25 degrees Celsius greater than the center section upon exiting from the heating device to the ambient temperature.

9. The method of claim 7, wherein the glass material and the shaped mold are cooled to a temperature that is about 0 degrees Celsius to about 50 degrees Celsius greater than a temperature corresponding to about $10^{13.2}$ Poise glass viscosity.

10. The method of claim 7, wherein the glass material comprises a three dimensional glass with a bend radius of about 5 millimeters to about 10 millimeters.

11. The method of claim 7, wherein the predetermined viscosity is greater than about $10^{11.81}$ Poise and wherein the predetermined viscosity is reached by cooling the glass material to less than about 50 degrees Celsius above an annealing point.

* * * * *